United States Patent
Ho et al.

(10) Patent No.: US 8,820,934 B1
(45) Date of Patent: Sep. 2, 2014

(54) PASSIVE SURFACE ACOUSTIC WAVE COMMUNICATION

(75) Inventors: Harvey Ho, Mountain View, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 17 days.

(21) Appl. No.: 13/603,531

(22) Filed: Sep. 5, 2012

(51) Int. Cl.
*G02C 7/04* (2006.01)

(52) U.S. Cl.
CPC ..................................... *G02C 7/04* (2013.01)
USPC ..................................... 351/219; 351/159.02

(58) Field of Classification Search
USPC ................. 351/159.02–159.38, 219
See application file for complete search history.

(56) References Cited

U.S. PATENT DOCUMENTS

| | | |
|---|---|---|
| 3,958,560 A | 5/1976 | March |
| 4,014,321 A | 3/1977 | March |
| 4,055,378 A | 10/1977 | Feneberg et al. |
| 4,122,942 A | 10/1978 | Wolfson |
| 4,136,250 A | 1/1979 | Mueller et al. |
| 4,143,949 A | 3/1979 | Chen |
| 4,153,641 A | 5/1979 | Deichert et al. |
| 4,214,014 A | 7/1980 | Hofer et al. |
| 4,309,085 A | 1/1982 | Morrison |
| 4,312,575 A | 1/1982 | Peyman et al. |
| 4,401,371 A | 8/1983 | Neefe |
| 4,463,149 A | 7/1984 | Ellis |
| 4,555,372 A | 11/1985 | Kunzler et al. |
| 4,604,479 A | 8/1986 | Ellis |
| 4,632,844 A | 12/1986 | Yanagihara et al. |
| 4,686,267 A | 8/1987 | Ellis et al. |
| 4,740,533 A | 4/1988 | Su et al. |
| 4,826,936 A | 5/1989 | Ellis |
| 4,996,275 A | 2/1991 | Ellis et al. |
| 4,997,770 A | 3/1991 | Giles et al. |
| 5,032,658 A | 7/1991 | Baron et al. |
| 5,034,461 A | 7/1991 | Lai et al. |
| 5,070,215 A | 12/1991 | Bambury et al. |
| 5,135,297 A | 8/1992 | Valint |
| 5,177,165 A | 1/1993 | Valint et al. |
| 5,177,168 A | 1/1993 | Baron et al. |
| 5,219,965 A | 6/1993 | Valint et al. |

(Continued)

FOREIGN PATENT DOCUMENTS

| | | |
|---|---|---|
| EP | 0369942 | 5/1990 |
| EP | 686372 | 12/1995 |

(Continued)

OTHER PUBLICATIONS

Wall, K., "Active contact lens that lets you see like the Terminator patented," Feb. 10, 2012, http://www.patexia.com/feed/active-contact-lens-that-lets-you-see-like-the-terminator-patented-2407, Last accessed Mar. 28, 2012, 5 pages.

(Continued)

*Primary Examiner* — Darryl J Collins
*Assistant Examiner* — Gary O'Neill
(74) *Attorney, Agent, or Firm* — McDonnell Boehnen Hulbert & Berghoff LLP

(57) ABSTRACT

This disclosure relates to systems and/or methods for detection of eye blinking by interrogating a passive surface acoustic wave based contact lens using an interrogation signal and interpreting reflections of the interrogation signal from the passive surface acoustic wave based contact lens.

21 Claims, 16 Drawing Sheets

(56) References Cited

U.S. PATENT DOCUMENTS

| | | |
|---|---|---|
| 5,260,000 A | 11/1993 | Nandu et al. |
| 5,271,875 A | 12/1993 | Appleton et al. |
| 5,310,779 A | 5/1994 | Lai |
| 5,321,108 A | 6/1994 | Kunzler et al. |
| 5,326,584 A | 7/1994 | Kamel et al. |
| 5,336,797 A | 8/1994 | McGee et al. |
| 5,346,976 A | 9/1994 | Ellis et al. |
| 5,358,995 A | 10/1994 | Lai et al. |
| 5,364,918 A | 11/1994 | Valint et al. |
| 5,387,662 A | 2/1995 | Kunzler et al. |
| 5,449,729 A | 9/1995 | Lai |
| 5,472,436 A | 12/1995 | Fremstad |
| 5,512,205 A | 4/1996 | Lai |
| 5,585,871 A | 12/1996 | Linden |
| 5,610,252 A | 3/1997 | Bambury et al. |
| 5,616,757 A | 4/1997 | Bambury et al. |
| 5,682,210 A | 10/1997 | Weirich |
| 5,708,094 A | 1/1998 | Lai et al. |
| 5,710,302 A | 1/1998 | Kunzler et al. |
| 5,714,557 A | 2/1998 | Kunzler et al. |
| 5,726,733 A | 3/1998 | Lai et al. |
| 5,760,100 A | 6/1998 | Nicolson et al. |
| 5,908,906 A | 6/1999 | Kunzler et al. |
| 5,981,669 A | 11/1999 | Valint et al. |
| 6,087,941 A | 7/2000 | Ferraz |
| 6,131,580 A | 10/2000 | Ratner et al. |
| 6,193,369 B1 | 2/2001 | Valint et al. |
| 6,200,626 B1 | 3/2001 | Grobe et al. |
| 6,213,604 B1 | 4/2001 | Valint et al. |
| 6,312,393 B1 | 11/2001 | Abreu |
| 6,348,507 B1 | 2/2002 | Heiler et al. |
| 6,366,794 B1 | 4/2002 | Moussy et al. |
| 6,423,001 B1 | 7/2002 | Abreu |
| 6,428,839 B1 | 8/2002 | Kunzler et al. |
| 6,431,705 B1 | 8/2002 | Linden |
| 6,440,571 B1 | 8/2002 | Valint et al. |
| 6,450,642 B1 | 9/2002 | Jethmalani et al. |
| 6,532,298 B1 | 3/2003 | Cambier et al. |
| 6,550,915 B1 | 4/2003 | Grobe, III |
| 6,570,386 B2 | 5/2003 | Goldstein |
| 6,579,235 B1 | 6/2003 | Abita et al. |
| 6,599,559 B1 | 7/2003 | McGee et al. |
| 6,614,408 B1 | 9/2003 | Mann |
| 6,630,243 B2 | 10/2003 | Valint et al. |
| 6,638,563 B2 | 10/2003 | McGee et al. |
| 6,726,322 B2 | 4/2004 | Andino et al. |
| 6,735,328 B1 | 5/2004 | Helbing et al. |
| 6,779,888 B2 | 8/2004 | Marmo |
| 6,804,560 B2 | 10/2004 | Nisch et al. |
| 6,851,805 B2 | 2/2005 | Blum et al. |
| 6,885,818 B2 | 4/2005 | Goldstein |
| 6,939,299 B1 | 9/2005 | Petersen et al. |
| 6,980,842 B2 | 12/2005 | March et al. |
| 7,018,040 B2 | 3/2006 | Blum et al. |
| 7,131,945 B2 | 11/2006 | Fink et al. |
| 7,169,106 B2 | 1/2007 | Fleischman et al. |
| 7,398,119 B2 | 7/2008 | Lambert et al. |
| 7,423,801 B2 | 9/2008 | Kaufman et al. |
| 7,429,465 B2 | 9/2008 | Muller et al. |
| 7,441,892 B2 | 10/2008 | Hsu |
| 7,443,016 B2 | 10/2008 | Tsai et al. |
| 7,450,981 B2 | 11/2008 | Jeon |
| 7,639,845 B2 | 12/2009 | Utsunomiya |
| 7,654,671 B2 | 2/2010 | Glynn |
| 7,699,465 B2 | 4/2010 | Dootjes et al. |
| 7,728,949 B2 | 6/2010 | Clarke et al. |
| 7,751,896 B2 | 7/2010 | Graf et al. |
| 7,799,243 B2 | 9/2010 | Mather et al. |
| 7,809,417 B2 | 10/2010 | Abreu |
| 7,878,650 B2 | 2/2011 | Fritsch et al. |
| 7,885,698 B2 | 2/2011 | Feldman |
| 7,907,931 B2 | 3/2011 | Hartigan et al. |
| 7,926,940 B2 | 4/2011 | Blum et al. |
| 7,931,832 B2 | 4/2011 | Pugh et al. |
| 7,964,390 B2 | 6/2011 | Rozakis et al. |
| 8,080,187 B2 | 12/2011 | Tepedino, Jr. et al. |
| 8,096,654 B2 | 1/2012 | Amirparviz et al. |
| 8,118,752 B2 | 2/2012 | Hetling et al. |
| 8,142,016 B2 | 3/2012 | Legerton et al. |
| 8,224,415 B2 | 7/2012 | Budiman |
| 2002/0193674 A1 | 12/2002 | Fleischman et al. |
| 2003/0179094 A1 | 9/2003 | Abreu |
| 2004/0027536 A1 | 2/2004 | Blum et al. |
| 2004/0116794 A1 | 6/2004 | Fink et al. |
| 2005/0045589 A1 | 3/2005 | Rastogi et al. |
| 2005/0221276 A1 | 10/2005 | Rozakis et al. |
| 2006/0025897 A1* | 2/2006 | Shostak et al. ............ 701/1 |
| 2007/0016074 A1 | 1/2007 | Abreu |
| 2007/0030443 A1 | 2/2007 | Chapoy et al. |
| 2007/0121065 A1 | 5/2007 | Cox et al. |
| 2007/0188710 A1 | 8/2007 | Hetling et al. |
| 2008/0208335 A1 | 8/2008 | Blum et al. |
| 2008/0218696 A1 | 9/2008 | Mir |
| 2009/0033863 A1 | 2/2009 | Blum et al. |
| 2009/0036761 A1 | 2/2009 | Abreu |
| 2009/0057164 A1 | 3/2009 | Minick et al. |
| 2009/0076367 A1 | 3/2009 | Sit et al. |
| 2009/0118604 A1 | 5/2009 | Phan et al. |
| 2009/0189830 A1 | 7/2009 | Deering et al. |
| 2009/0196460 A1 | 8/2009 | Jakobs et al. |
| 2010/0001926 A1 | 1/2010 | Amirparviz et al. |
| 2010/0013114 A1 | 1/2010 | Bowers et al. |
| 2010/0016704 A1* | 1/2010 | Naber et al. ............ 600/398 |
| 2010/0028559 A1 | 2/2010 | Yan et al. |
| 2010/0072643 A1 | 3/2010 | Pugh et al. |
| 2010/0109175 A1 | 5/2010 | Pugh et al. |
| 2010/0110372 A1 | 5/2010 | Pugh et al. |
| 2010/0113901 A1 | 5/2010 | Zhang et al. |
| 2010/0133510 A1 | 6/2010 | Kim et al. |
| 2010/0249548 A1 | 9/2010 | Muller |
| 2011/0015512 A1 | 1/2011 | Pan et al. |
| 2011/0028807 A1 | 2/2011 | Abreu |
| 2011/0040161 A1 | 2/2011 | Abreu |
| 2011/0055317 A1 | 3/2011 | Vonog et al. |
| 2011/0063568 A1 | 3/2011 | Meng et al. |
| 2011/0084834 A1 | 4/2011 | Sabeta |
| 2011/0116035 A1 | 5/2011 | Fritsch et al. |
| 2011/0157541 A1 | 6/2011 | Peyman |
| 2011/0157544 A1 | 6/2011 | Pugh et al. |
| 2011/0184271 A1 | 7/2011 | Veciana et al. |
| 2011/0274680 A1 | 11/2011 | Mazed et al. |
| 2011/0286064 A1 | 11/2011 | Burles et al. |
| 2011/0298794 A1 | 12/2011 | Freedman |
| 2012/0026458 A1 | 2/2012 | Qiu et al. |
| 2012/0038881 A1 | 2/2012 | Amirparviz et al. |
| 2012/0041287 A1 | 2/2012 | Goodall et al. |
| 2012/0041552 A1 | 2/2012 | Chuck et al. |
| 2012/0069254 A1 | 3/2012 | Burton |
| 2012/0075168 A1 | 3/2012 | Osterhout et al. |
| 2012/0075574 A1 | 3/2012 | Pugh et al. |
| 2012/0078071 A1 | 3/2012 | Bohm et al. |
| 2012/0088258 A1 | 4/2012 | Bishop et al. |
| 2012/0092612 A1 | 4/2012 | Binder |
| 2012/0109296 A1 | 5/2012 | Fan |
| 2012/0177576 A1 | 7/2012 | Hu |
| 2012/0201755 A1 | 8/2012 | Rozakis et al. |
| 2012/0245444 A1 | 9/2012 | Otis et al. |
| 2012/0259188 A1 | 10/2012 | Besling |

FOREIGN PATENT DOCUMENTS

| | | |
|---|---|---|
| EP | 1061874 | 12/2000 |
| EP | 1617757 | 1/2006 |
| EP | 1818008 | 8/2007 |
| EP | 1947501 | 7/2008 |
| EP | 2457122 | 5/2012 |
| WO | 95/04609 | 2/1995 |
| WO | 0116641 | 3/2001 |
| WO | 01/34312 | 5/2001 |
| WO | 03065876 | 8/2003 |
| WO | 2004/060431 | 7/2004 |
| WO | 2004064629 | 8/2004 |
| WO | 2006015315 | 2/2006 |
| WO | 2009094643 | 7/2009 |

(56) References Cited

FOREIGN PATENT DOCUMENTS

| WO | 2010105728 | 9/2010 |
|---|---|---|
| WO | 2010133317 | 11/2010 |
| WO | 2011/011344 | 1/2011 |
| WO | 2011034592 | 3/2011 |
| WO | 2011035228 | 3/2011 |
| WO | 2011035262 | 3/2011 |
| WO | 2011083105 | 7/2011 |
| WO | 2011163080 | 12/2011 |
| WO | 2012035429 | 3/2012 |
| WO | 2012037455 | 3/2012 |
| WO | 2012051167 | 4/2012 |
| WO | 2012051223 | 4/2012 |
| WO | 2012052765 | 4/2012 |

OTHER PUBLICATIONS

Parviz, Babak A., "Augmented Reality in a Contact Lens," IEEE Spectrum, Sep. 2009, http://spectrum.ieee.org/biomedical/bionics/augmented-reality-in-a-contact-lens/0, Last accessed Mar. 14, 2012, 6 pages.

Bionic contact lens 'to project emails before eyes,' http://www.kurzweilai.net/forums/topic/bionic-contact-lens-to-project-emails-before-eyes, Last accessed Mar. 14, 2012, 2 pages.

Tweedie, et al., "Contact creep compliance of viscoelastic materials via nanoindentation," J. Mater. Res., Jun. 2006, vol. 21, No. 2, pp. 1576-1589, Materials Research Society.

Brahim, et al., "Polypyrrole-hydrogel composites for the construction of clinically important biosensors," 2002, Biosensors & Bioelectronics, vol. 17, pp. 53-59.

Huang, et al., "Wrinkling of Ultrathin Polymer Films," Mater. Res. Soc. Symp. Proc., 2006, vol. 924, 6 pages, Materials Research Society.

Zarbin, et al., "Nanotechnology in ophthalmology," Can J Ophthalmol, 2010, vol. 45, No. 5, pp. 457-476.

Selner, et al., "Novel Contact Lens Electrode Array for Multi-electrode Electroretinography (meERG)," IEEE, 2011, 2 pages.

Liao, et al., "A 3-µW CMOS Glucose Sensor for Wireless Contact-Lens Tear Glucose Monitoring," IEEE Journal of Solid-State Circuits, Jan. 2012, vol. 47, No. 1, pp. 335-344.

Chen, et al., "Microfabricated Implantable Parylene-Based Wireless Passive Intraocular Pressure Sensors," Journal of Microelectromechanical Systems, Dec. 2008, vol. 17, No. 6, pp. 1342-1351.

Thomas, et al., "Functional Contact Lenses for Remote Health Monitoring in Developing Countries," IEEE Global Humanitarian Technology Conference, 2011, pp. 212-217, IEEE Computer Society.

Pandey, et al., "A Fully Integrated RF-Powered Contact Lens With a Single Element Display," IEEE Transactions on Biomedical Circuits and Systems, Dec. 2010, vol. 4, No. 6, pages.

Lingley, et al., "Multipurpose integrated active contact lenses," SPIE, 2009, 2 pages.

Chu, et al., "Soft Contact-lens Sensor for Monitoring Tear Sugar as Novel Wearable Device of Body Sensor Network," http://www.ksi.edu/seke/dms11/DMS/2_Kohji_Mitsubayashi.pdf, Last accessed Jul. 27, 2012, 4 pages.

Liao, et al., "A 3µW Wirelessly Powered CMOS Glucose Sensor for an Active Contact Lens," 2011 IEEE International Solid-State Circuits Conference, Session 2, Feb. 21, 2011, 3 pages.

Hurst, "How contact lenses could help save your life," Mail Online, Apr. 19, 2010, http://www.dailymail.co.uk/health/article-1267345/How-contact-lenses-help-save-life.html, Last accessed Jul. 27, 2012.

Lončar, et al., "Design and Fabrication of Silicon Photonic Crystal Optical Waveguides," Journal of Lightwave Technology, Oct. 2000, vol. 18, No. 10, pp. 1402-1411.

Liu, et al., "Miniature Amperometric Self-Powered Continuous Glucose Sensor with Linear Response," Analytical Chemistry, 7 pages.

Baxter, "Capacitive Sensors," 2000, 17 pages.

Lingley, et al., "A Single-Pixel Wireless Contact Lens Display," Journal of Micromechanics and Microengineering, 2011, 9 pages.

"Polyvinylidene fluoride," Wikipedia, http://en.wikipedia.org/wiki/Polyvinylidene_fluoride, Last accessed Mar. 30, 2012, 4 pages.

Murdan, "Electro-responsive drug delivery from hydrogels," Journal of Controlled Release, 2003, vol. 92, pp. 1-17.

Haders, "New Controlled Release Technologies Broaden Opportunities for Ophthalmic Therapies," Drug Delivery Technology, Jul./Aug. 2009, vol. 8, No. 7, pp. 48-53.

Singh, et al., "Novel Approaches in Formulation and Drug Delivery using Contact Lenses," Journal of Basic and Clinical Pharmacy, May 2011, vol. 2, Issue 2, pp. 87-101.

"Contact Lenses: Look Into My Eyes," The Economist, Jun. 2, 2011, http://www.economist.com/node/18750624/print, Last accessed Mar. 13, 2012, 8 pages.

Holloway, "Microsoft developing electronic contact lens to monitor blood sugar," Gizmag, Jan. 5, 2012, http://www.gizmag.com/microsoft-electronic-diabetic-contact-lens/20987/, Last accessed Mar. 13, 2012, 5 pages.

Unpublished U.S. Appl. No. 13/240,994, Titled "See-Through Display With Infrared Eye-Tracker," filed Sep. 22, 2011, 38 pages.

Unpublished U.S. Appl. No. 13/209,706, Titled "Optical Display System and Method with Gaze Tracking," filed Aug. 15, 2011, 30 pages.

Adler, "What types of statistical analysis do scientists use most often?" O'Reilly Community, Jan. 15, 2012, 2 pages, http://broadcast.oreilly.com/2010/01/what-types-of-statistical-anal.html, Last accessed Sep. 4, 2012.

Bull, "Different Types of Statistical Analysis," Article Click, Feb. 4, 2008, 4 pages, http://www.articleclick.com/Article/Different-Types-Of-Statistical-Analysis/968252, Last accessed Sep. 4, 2012.

Ho, H., et al., "Fabrication methods for creating flexible polymer substrate sensor tags," Journal of Vacuum Science & Technology B, vol. 27, No. 6, Dec. 4, 2009, pp. 3104-3108.

Badugu et al., "A Glucose Sensing Contact Lens: A Non-Invasive Technique for Continuous Physiological Glucose Monitoring," Journal of Fluorescence, Sep. 2003, pp. 371-374, vol. 13, No. 5.

Carlson et al., "A 20 mV Input Boost Converter With Efficient Digital Control for Thermoelectric Energy Harvesting," IEEE Journal of Solid-State Circuits, Apr. 2010, pp. 741-750, vol. 45, No. 4.

Chu et al., "Biomedical soft contact-lens sensor for in situ ocular biomonitoring of tear contents," Biomed Microdevices, 2011, pp. 603-611, vol. 13.

Chu et al., "Soft contact lens biosensor for in situ monitoring of tear glucose as non-invasive blood sugar assessment," Talanta, 2011, pp. 960-965, vol. 83.

Ho et al., "Contact Lens With Integrated Inorganic Semiconductor Devices," MEMS 2008. IEEE 21st International Conference on. IEEE, 2008., pp. 403-406.

Lähdesmäki et al., "Possibilities for Continuous Glucose Monitoring by a Functional Contact Lens," IEEE Instrumentation & Measurement Magazine, Jun. 2010, pp. 14-17.

Lingley et al., "A contact lens with integrated micro solar cells," Microsyst Technol, 2012, pp. 453-458, vol. 18.

Parviz, Babak A., "For Your Eyes Only," IEEE Spectrum, Sep. 2009, pp. 36-41.

Saeedi, E. et al., "Self-assembled crystalline semiconductor optoelectronics on glass and plastic," J. Micromech. Microeng., 2008, pp. 1-7, vol. 18.

Saeedi et al., "Self-Assembled Inorganic Micro-Display on Plastic," Micro Electro Mechanical Systems, 2007. MEMS. IEEE 20th International Conference on. IEEE, 2007., pp. 755-758.

Sensimed Triggerfish, Sensimed Brochure, 2010, 10 pages.

Shih, Yi-Chun et al., "An Inductorless DC-DC Converter for Energy Harvesting With a 1.2-µW Bandgap-Referenced Output Controller," IEEE Transactions on Circuits and Systems-II: Express Briefs, Dec. 2011, pp. 832-836, vol. 58, No. 12.

Shum et al., "Functional modular contact lens," Proc. of SPIE, 2009, pp. 73970K-1 to 73970K-8, vol. 7397.

Stauth et al., "Self-assembled single-crystal silicon circuits on plastic," PNAS, Sep. 19, 2006, pp. 13922-13927, vol. 103, No. 38.

Yao, H. et al., "A contact lens with integrated telecommunication circuit and sensors for wireless and continuous tear glucose monitoring," J. Micromech. Microeng., 2012, pp. 1-10, vol. 22.

(56) References Cited

OTHER PUBLICATIONS

Yao, H. et al., "A Dual Microscal Glucose Sensor on a Contact Lens, Tested in Conditions Mimicking the Eye," Micro Electro Mechanical Systems (MEMS), 2011 IEEE 24th International Conference on. IEEE, 2011, pp. 25-28.

Yao et al., "A contact lens with embedded sensor for monitoring tear glucose level," Biosensors and Bioelectronics, 2011, pp. 3290-3296, vol. 26.

Yao, H. et al., "A Soft Hydrogel Contact Lens with an Encapsulated Sensor for Tear Glucose Monitoring," Micro Electro Mechanical Systems (MEMS), 2012 IEEE 25th International Conference on. IEEE, 2012, pp. 769-772.

Yeager et al., "A 9 µA, Addressable Gent Sensor Tag for Biosignal Acquistion," IEEE Journal of Solid-State Circuits, Oct. 2010, pp. 2198-2209, vol. 45, No. 10.

Zhang et al., "Design for Ultra-Low Power Biopotential Amplifiers for Biosignal Acquistion Applications," IEEE Transactions on Biomedical Circuits and Systems, 2012, pp. 344-355, vol. 6, No. 4.

* cited by examiner

PASSIVE SURFACE ACOUSTIC WAVE COMMUNICATION

TECHNICAL FIELD

This disclosure generally relates to systems and methods for detecting eye blinking using a passive surface acoustic wave based contact lens.

DETAILED DESCRIPTION

Overview

Figure 1:
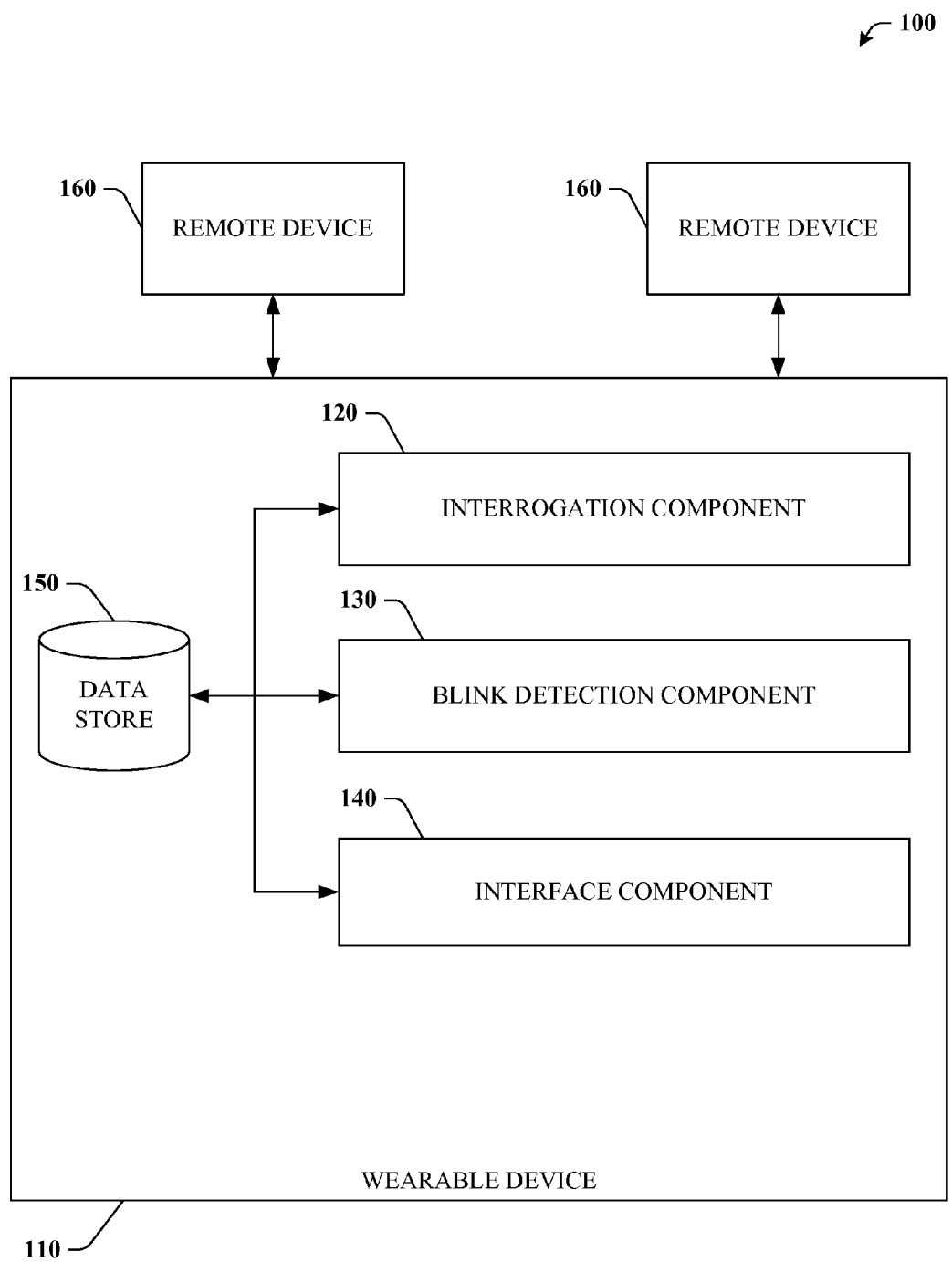
FIG. 1 illustrates a diagram of an exemplary non-limiting system for detecting eye blinking using a passive surface acoustic wave based contact lens in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a mechanism is provided for detecting blinking of an eye via a passive surface acoustic wave based contact lens (hereinafter referred to as "SAW contact lens"). For example, a SAW contact lens can be placed in one or both eyes of a user and a wearable device can periodically interrogate the contact lens in order to determine (or infer) blinking of the eye. In a non-limiting example, a wearable device can interrogate the contact lens at intervals that are less than an average or shortest length of time of an eye blink. It is to be appreciated that both eyes of a human user generally blink at the same time, and thus in various embodiments only one passive surface acoustic wave (SAW) based contact lens is needed, and a wearable device can be configured to interrogate the SAW contact lens. In another embodiment, two such SAW contact lenses can be employed such that a user can selectively blink one or both eyes to generate a command to a device. In yet another embodiment, the SAW contact lens and wearable device can be employed in connection with non-human users (e.g., dogs or other species with eyes). Furthermore, detected (or inferred) blinking can include determination or inference of full or partial eye blinks.

While the herein embodiments disclose a wearable device to interrogate the passive surface acoustic wave based contact lens, it is to be appreciated that a non-wearable device can be employed to interrogate the SAW contact lens. A device (e.g., eye scanner, mobile phone, a booth, a remote device, . . . ) in or on which the SAW contact lens wearer places his head can interrogate the contact lens. In addition, the non-wearable device can interrogate the contact lens to detect eye blinks in connection with the user issuing commands to the device for control thereof.

Wearable device can include, for example, head mounted device, heads-up display glasses, a monocle, eyeglasses, sunglasses, a headset, a visor, a cap, a helmet, a mask, a headband, clothing, or any other suitable device that can be worn by a human or non-human user in a position to interrogate the passive SAW contact lens worn by a user.

Referring now to the drawings, FIG. 1 depicts a system 100 for detecting (or inferring) eye blinking using a passive SAW contact lens. System 100 includes a wearable device 110 that interrogate the SAW contacts lens and determines (or infers) blinking of an eye on which the contacts lens is worn. In addition, wearable device 110 can utilize information regarding the determined (or inferred) blinking of the eye (hereinafter referred to as "eye blink information") locally to control features of the wearable device (e.g., adjusting content presentation, activating or deactivating options, or any other suitable function). Furthermore, wearable device 110 can communicate the eye blink information to remote devices 160 for employment in connection with operations associated with the remote devices 160, e.g., adjusting content presentation, or controlling a user interface. Wearable device 110 and remote devices 160 can also receive input from users to control interaction with and presentation of content, see e.g., FIG. 7 and corresponding disclosure.

Figure 7:
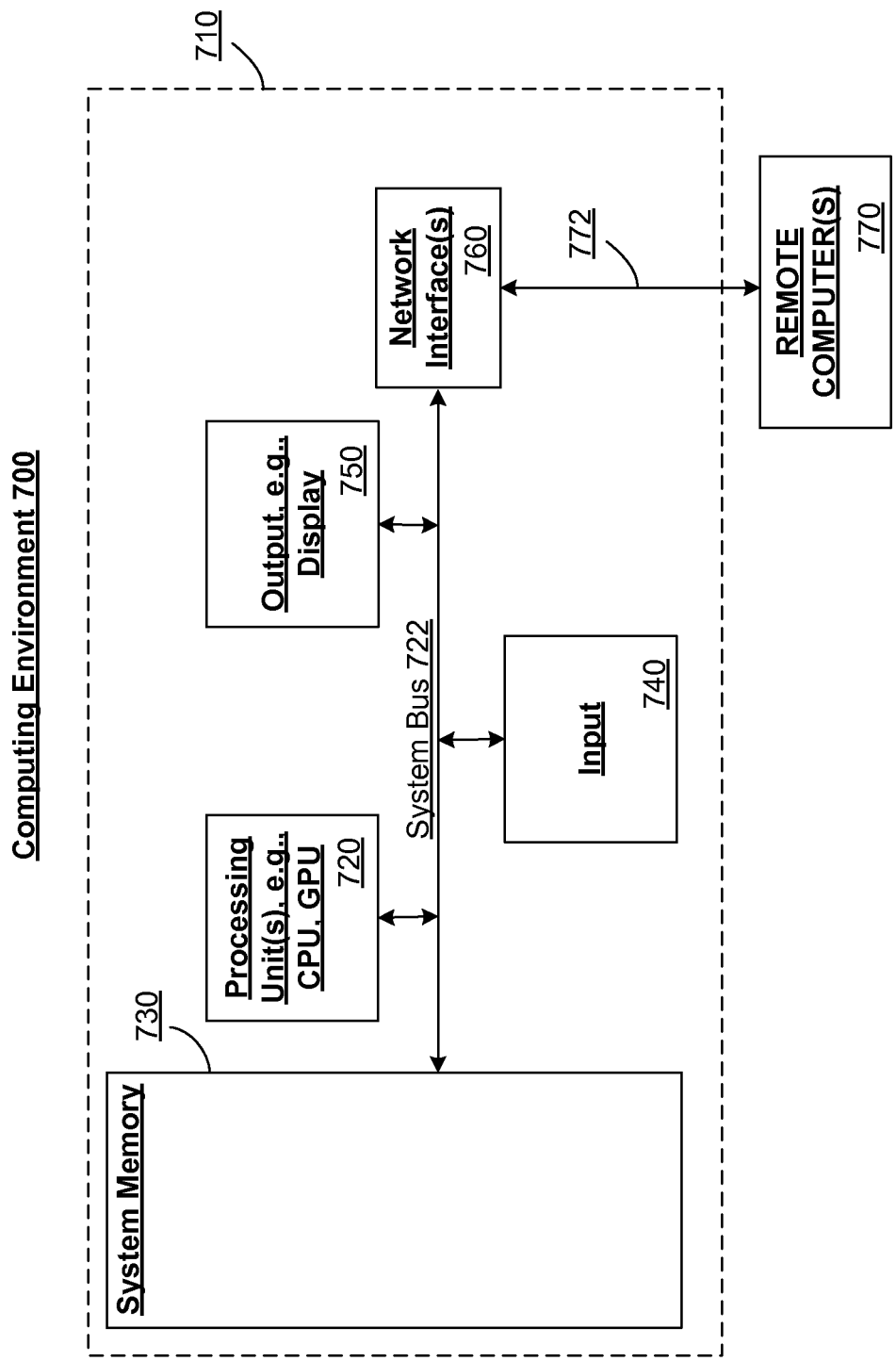
FIG. 7 is a block diagram representing an exemplary non-limiting computing system or operating environment in which the various embodiments can be implemented.

Wearable device 110 and remote devices 160, respectively include a memory that stores computer executable components and a processor that executes computer executable components stored in the memory (see e.g., FIG. 7). Wearable device 110 and remote devices 160 can communicate via a wired and/or wireless network. It is to be appreciated that while only two remote devices 160 are depicted, wearable device 110 can communicate with any suitable number of remote devices 160 concurrently, serially, an ad hoc manner, or in accordance with any suitable protocol.

The remote device 160 can interact with or supply content locally, or remotely over a wired or wireless communication link (e.g., the remote device can be a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, wearable device, . . . ). Moreover, wearable device 110 and remote devices 160 can include a user interface (e.g., a web browser or application), that can receive and present graphical indicia (e.g., displays, text, video . . . ) generated locally or remotely.

Wearable device 110 includes interrogation component 120 that interrogates passive SAW contact lenses worn by users. Wearable device 110 further includes blink detection component 130 that determines (or infers) blinking of an eye based on interrogation of the passive SAW contact lens interrogation component 120. In addition, wearable device 110 includes an interface component 140 that communicates determined (or inferred) blinking of the eye to remote devices 160 and can receive data from remote devices 160. Wearable device 110 can also include components (not shown) for employing determined (or inferred) blinking of the eye locally as describe above. Additionally, wearable device 110 can include a data store 150 that can store from data interrogation component 120, blink detection component 130, or interface component 140. Data store 150 can reside on any suitable type of storage device, non-limiting examples of which are illustrated with reference to FIGS. 6 and 7 and corresponding disclosure.

With continued reference to FIG. 1, interrogation component 120 periodically transmits an interrogation signal to passive SAW contact lens and can receive a reflection of the interrogation signal from the passive SAW contact lens. In a non-limiting example, interrogation component 120 can transmit the interrogation signal at intervals that are less than an average or shortest length of time of an eye blink to avoid missing detection of a blink. For example, if the average human user has a blink that is X milliseconds, interrogation component 120 can transmit an interrogation signal at an interval less than X milliseconds. In another example, if the shortest blink for a human user is Y milliseconds, interrogation component 120 can transmit an interrogation signal at an interval less than Y milliseconds. It is to be appreciated that any suitable interval for transmitting an interrogation signal can be employed.

Figure 2A:
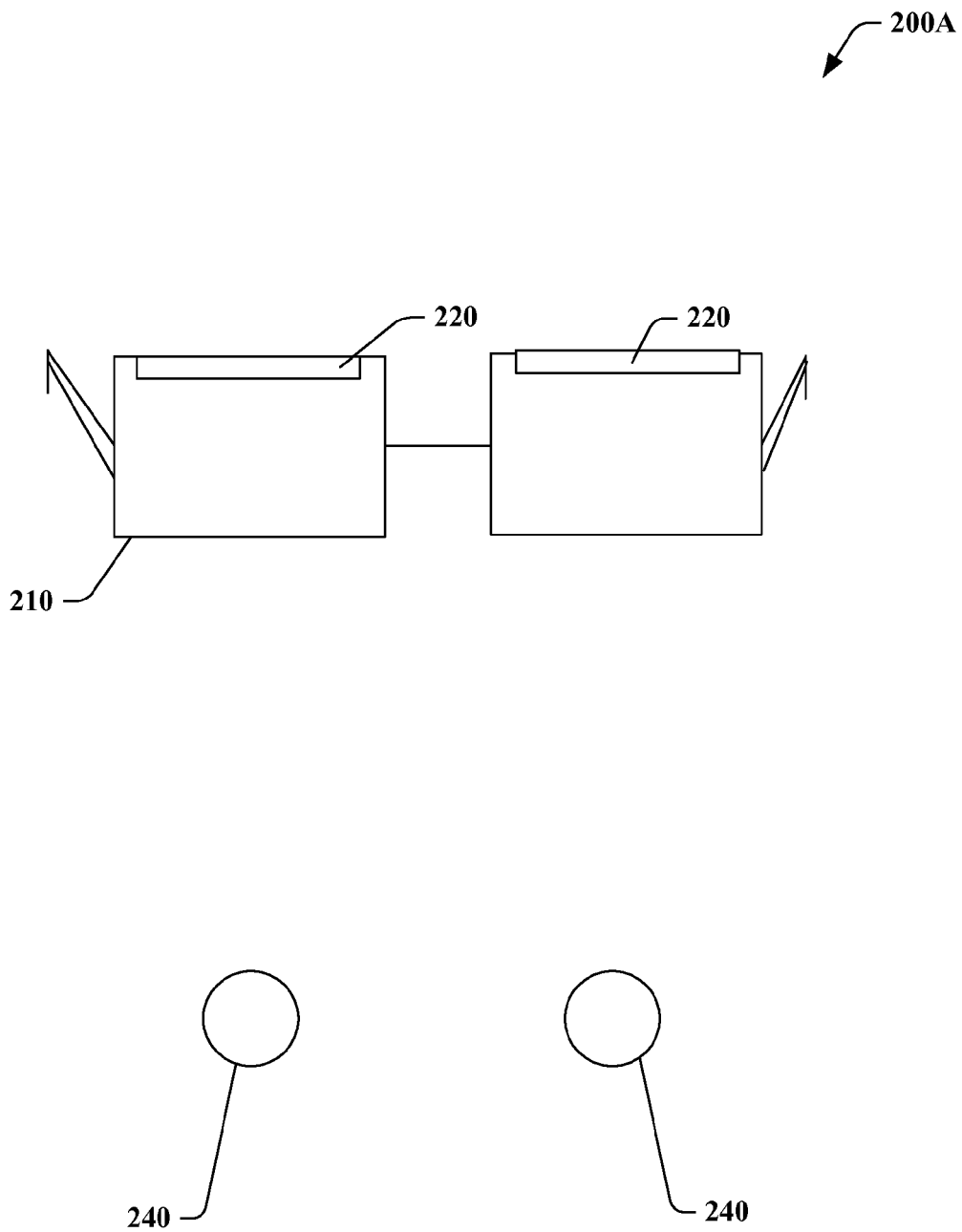
FIG. 2A illustrates a diagram of an exemplary non-limiting pair of heads-up display glasses with one or more interrogation signal transceivers arranged in or on the frame of the heads-up display glasses for detecting blinking using passive surface acoustic wave based contact lenses which can be worn on one or both eyes in accordance with an implementation of this disclosure.

Referring to FIG. 2A, system 200A is depicted comprising a wearable device 210, which can be substantially similar to wearable device 110, being a pair of heads-up display glasses with one or more interrogation signal transceivers 220 arranged in or on the frame of the heads-up display glasses for interrogating the passive SAW contact lens 240 which can be worn in one or both eyes. Interrogation signal transceiver 220 can be any suitable device for transmitting a signal to and receiving a signal from passive SAW contact lens 240. In the depicted example, one interrogation signal transceiver 220 is provided for each eye arranged at the top of the heads-up display glasses frame. It is to be appreciated that any suitable number of interrogation signal transceivers 220 can be employed for each eye and arranged in suitable locations of wearable device 210 for transmitting a signal to and receiving a signal from passive SAW contact lens 240. It is to be further appreciated that interrogation signal transceiver 220 can have a transmission power and/or signal reception sensitivity suitable for transmitting a signal to and receiving a signal from an associated passive SAW contact lens 240 in an eye without interfering with another passive SAW contact lens 240 in another eye. Additionally, respective SAW contact lenses can be differentiated by using unique frequencies.

Figure 2B:
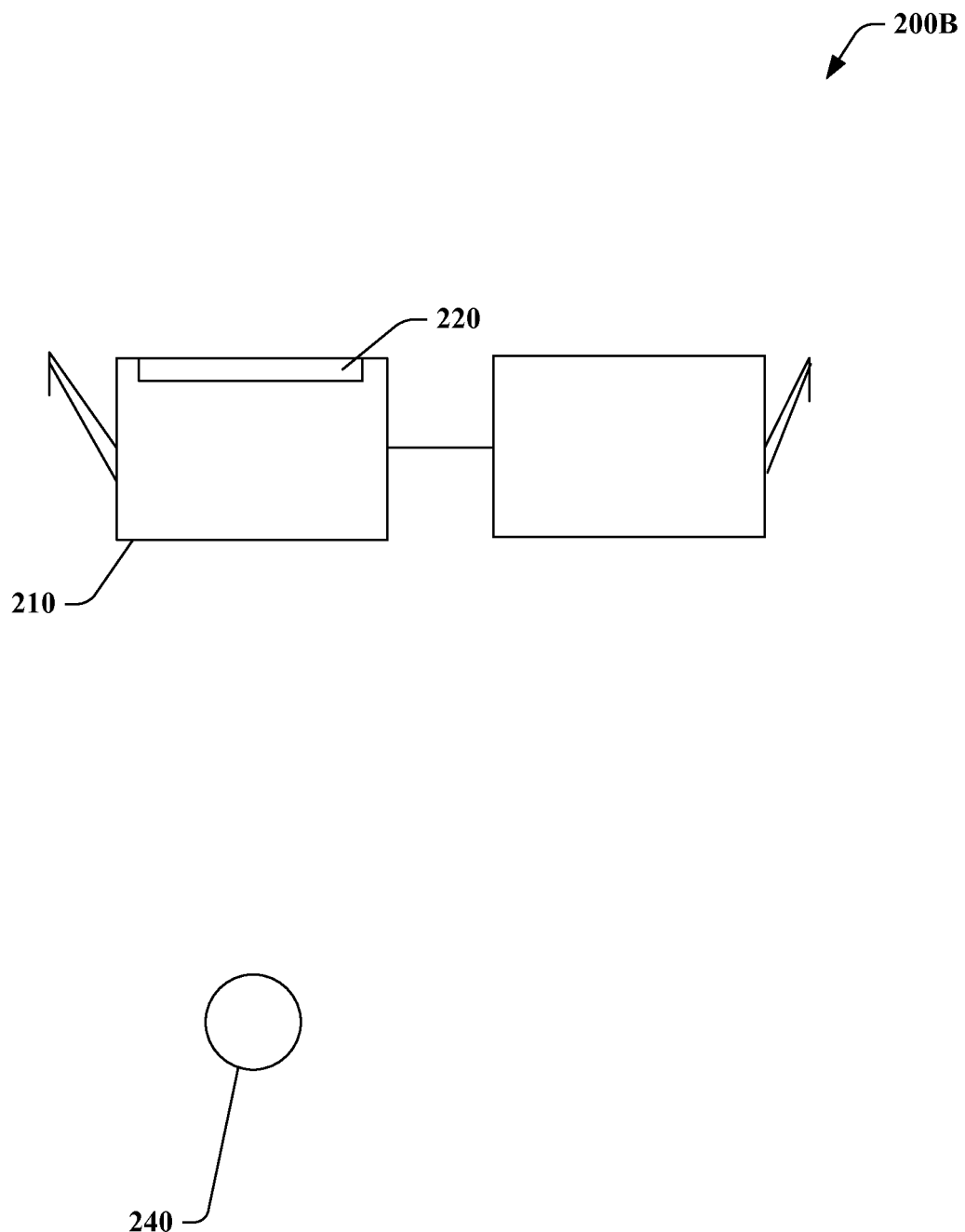
FIG. 2B illustrates a diagram of an exemplary non-limiting pair of heads-up display glasses with one or more interrogation signal transceivers arranged in or on the frame of the heads-up display glasses for detecting a blinking using passive surface acoustic wave based contact lens which can be worn on one eye in accordance with an implementation of this disclosure.

Referring to FIG. 2B, system 200B is depicted comprising a wearable device 210 being a pair of heads-up display glasses with one or more interrogation signal transceivers 220 arranged in or on the frame near a portion of the heads-up display glasses for interrogating passive SAW contact lens 240 in one eye. While FIG. 2B depicts an interrogation signal transceiver 220 and passive SAW contact lens 240 arrangement for detection of blinks in the right eye, it is to be appreciated that interrogation signal transceiver 220 and passive SAW contact lens 240 can be arranged near the left eye. It is to be further appreciated that any suitable number of interrogation signal transceivers 220 can be employed for each eye and arranged in any location of wearable device 210 suitable for interrogating passive SAW contact lens 240.

Figure 2C:
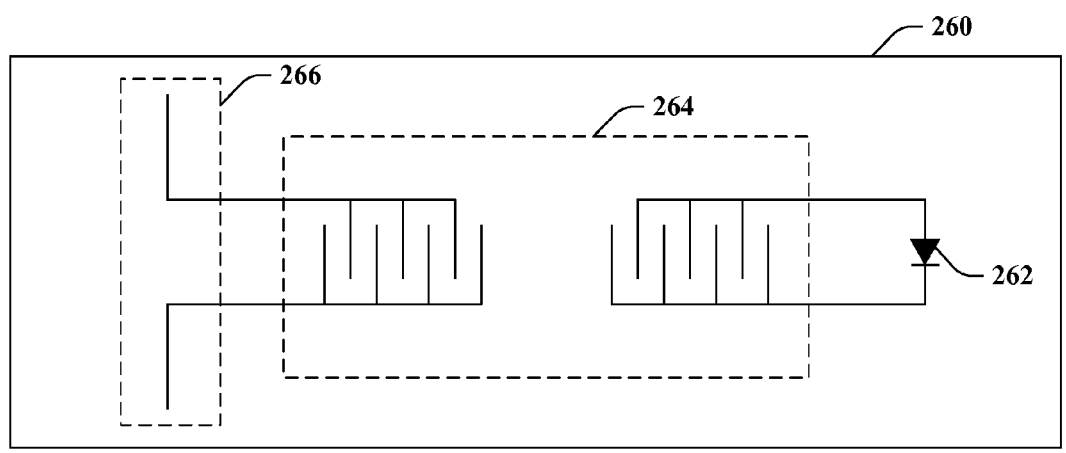
FIG. 2C illustrates a diagram of an exemplary a surface wave acoustic based sensing component suitable for placement on or within the substrate of a contact lens in accordance with an implementation of this disclosure.

Referring to FIG. 2C, a surface wave acoustic based sensing component 260 (hereinafter referred to as "SAW sensing component") is depicted suitable for placement on or within the substrate of a SAW contact lens 240. SAW sensing component 260 comprises an antenna 266, a surface acoustic wave filter 264 (hereinafter referred to as "SAW filter"), and a sensor 262. It is to be appreciated that antenna can be any suitable type for receiving interrogation signal and reflecting all, none, or a portion of the interrogation signal. In an embodiment, antenna 266 is a resonant dipole antenna. Furthermore, antenna 266 can be of a size that is suitable to receive an interrogation signal from interrogation signal transceiver 220 and/or to reflect all, none, or a portion of the interrogation signal at a signal strength sufficient for reception by interrogation signal transceiver 220. Antenna 266 propagates electrical energy from the received interrogation signal to SAW filter 264. SAW filter 264 converts the electrical energy to mechanical energy and converts mechanical energy to electrical energy. Sensor 262 is any suitable sensor that changes electrical impedance based on a condition that changes according to blinking of the eye. For example, sensor 262 can be a photodiode that changes electrical impedance based upon an amount of light received at the photodiode, such as difference in amount of light incident on the photodiode when an eyelid covers the photodiode versus not covering the photodiode. In another example, sensor 262 can be a pressure sensor that changes electrical impedance according to pressure change caused by an eyelid covering sensor 262. In a further example, sensor 262 can be a conductivity sensor that changes electrical impedance according to change in conductivity from a tear film caused by an eyelid covering sensor 262. In an additional example, sensor 262 can be a temperature sensor that changes electrical impedance according to a change in temperature as a tear film caused by an eyelid covering sensor 262 evaporates. A mismatch in impedance between surface wave acoustic filter 264 and sensor 262 can cause a portion of the interrogation signal to propagate back towards the SAW filter 264 and to antenna 266 resulting in a reflected transmission of a portion of the interrogation signal from antenna 266. It is to be appreciated that an amount of reflected transmission of a portion of the interrogation signal can be a function of amount of impedance mismatch between SAW filter 264 and sensor 262. The reflected portion of the interrogation signal is received by interrogation signal transceiver 220. It is to be appreciated that respective SAW filters 264 can vary between respective SAW sensing components 260 in order to have unique operating frequencies for respective SAW sensing components 260 detectable by interrogation signal transceiver 220. In an embodiment, a first SAW sensing component 260 can have a first SAW filter 264 operating at 2412 MHz, while a second SAW sensing component 260 can have a second SAW filter 264 operating at 2417 Mhz. It is to be appreciated that any suitable operating frequency can be employed for SAW filter 264 and one or more associated interrogation signal transceivers 220 can be employed to operate at a compatible frequency or range of frequencies. Advantageously, employing unique operating frequencies for SAW filters 264 allows for having uniquely detectable SAW sensing components 260 in a single SAW contact lens 240 or in SAW contact lenses 240 in two respective eyes of a user.

Figure 2D:
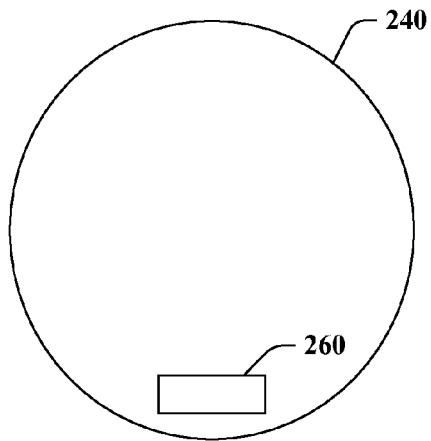
FIG. 2D illustrates a diagram of an exemplary non-limiting surface wave acoustic based contact lens with a single surface wave acoustic based sensing component aligned at the bottom of the contact lens in accordance with an implementation of this disclosure.
Figure 2E:
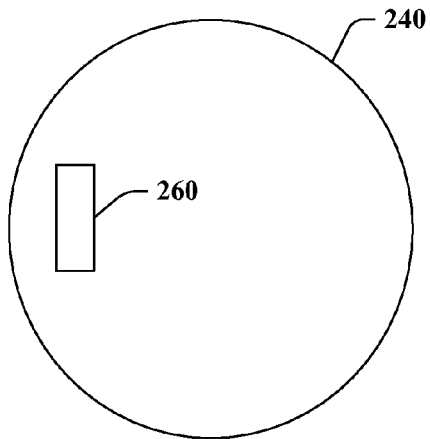
FIG. 2E illustrates a diagram of an exemplary non-limiting surface wave acoustic based contact lens with a single surface wave acoustic based sensing component aligned at one side of the contact lens in accordance with an implementation of this disclosure.
Figure 2F:
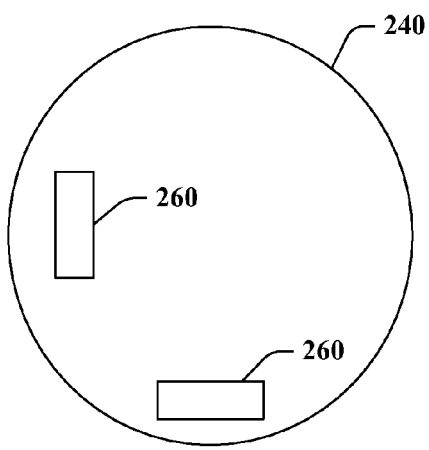
FIG. 2F illustrates a diagram of an exemplary non-limiting surface wave acoustic based contact lens with two surface wave acoustic based sensing components aligned at the bottom and one side of the contact lens in accordance with an implementation of this disclosure.
Figure 2G:
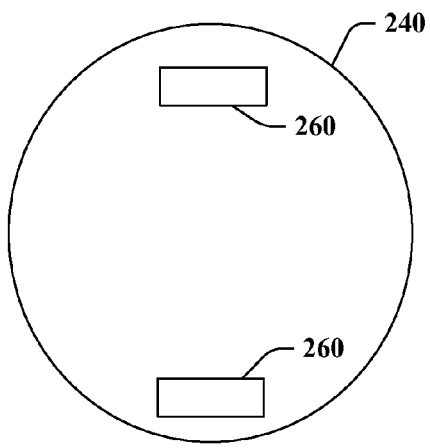
FIG. 2G illustrates a diagram of an exemplary non-limiting surface wave acoustic based contact lens with two surface wave acoustic based sensing components aligned at the top and bottom of the contact lens in accordance with an implementation of this disclosure.
Figure 2H:
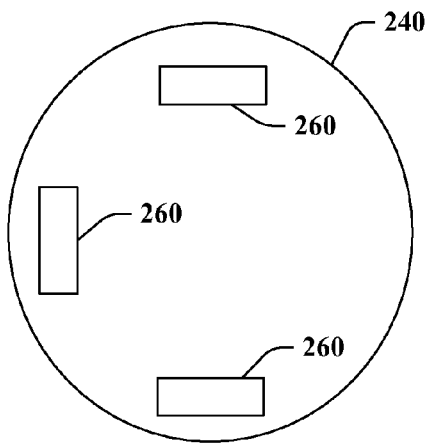
FIG. 2H illustrates a diagram of an exemplary non-limiting surface wave acoustic based contact lens with three surface wave acoustic based sensing components aligned at the top, bottom, and one side of the contact lens in accordance with an implementation of this disclosure.
Figure 2I:
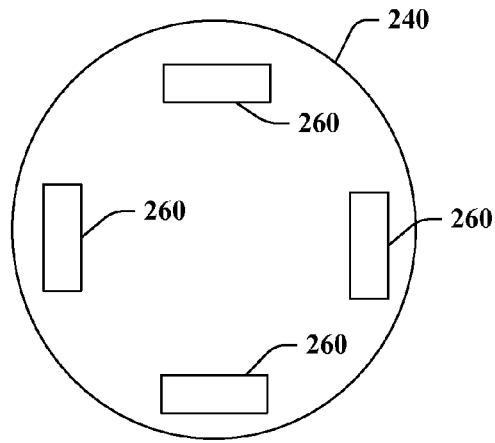
FIG. 2I illustrates a diagram of an exemplary non-limiting surface wave acoustic based contact lens with four surface wave acoustic based sensing components aligned at the top, bottom, and both sides of the contact lens in accordance with an implementation of this disclosure.

Referring to FIGS. 2D-I, various exemplary configurations of SAW sensing components 260 in a SAW contact lens 240 are depicted. In an embodiment, SAW contact lens 240 can be weighted to self-align into a particular position when worn, similar to toric contact lenses. For example, when one or two SAW sensing components 260 are employed, the SAW sensing components 260 may require specific positioning in order to detect eye blinks. In another embodiment, SAW contact lens 240 are not weighted. For example, sufficient SAW sensing components 260 can be employed in an arrangement, such as four SAW sensing components 260 equally spaced around a periphery of the contact lens 240 to detect blink in most any orientation of the SAW contact lens 240. FIG. 2D depicts a SAW contact lens 240 with a single SAW sensing component 260 aligned at a bottom of contact lens 240. FIG. 2E illustrates a SAW contact lens 240 with a single SAW sensing component 260 aligned at one side of contact lens 240. FIG. 2F depicts a SAW contact lens 240 with two SAW sensing components 260 aligned at a bottom and one side of contact lens 240. FIG. 2G shows a SAW contact lens 240 with two SAW sensing components 260 aligned at top and bottom of contact lens 240. FIG. 2H depicts a SAW contact lens 240 with three SAW sensing components 260 aligned at top, bottom, and one side of contact lens 240. FIG. 2I illustrates a SAW contact lens 240 with four SAW sensing components 260 aligned at top, bottom, and both sides of contact lens 240. Employing more than one uniquely identifiable SAW sensing component 260 can allow for detecting partial eye blinks or an amount of eye blink. It is to be appreciated that any suitable number of SAW sensing components 260 can be respectively placed in any suitable locations of SAW contact lens 240.

Referring back to FIG. 1, interrogation component 120 receives reflected interrogation signal information corresponding to one or more SAW sensing components 260 from interrogation signal transceivers 220 on wearable device 110. Reflected interrogation signal information can include strength of received reflected interrogation signal, frequency of the received interrogation signal, or any suitable type of information related to the reflected interrogation signal.

Figure 2J:
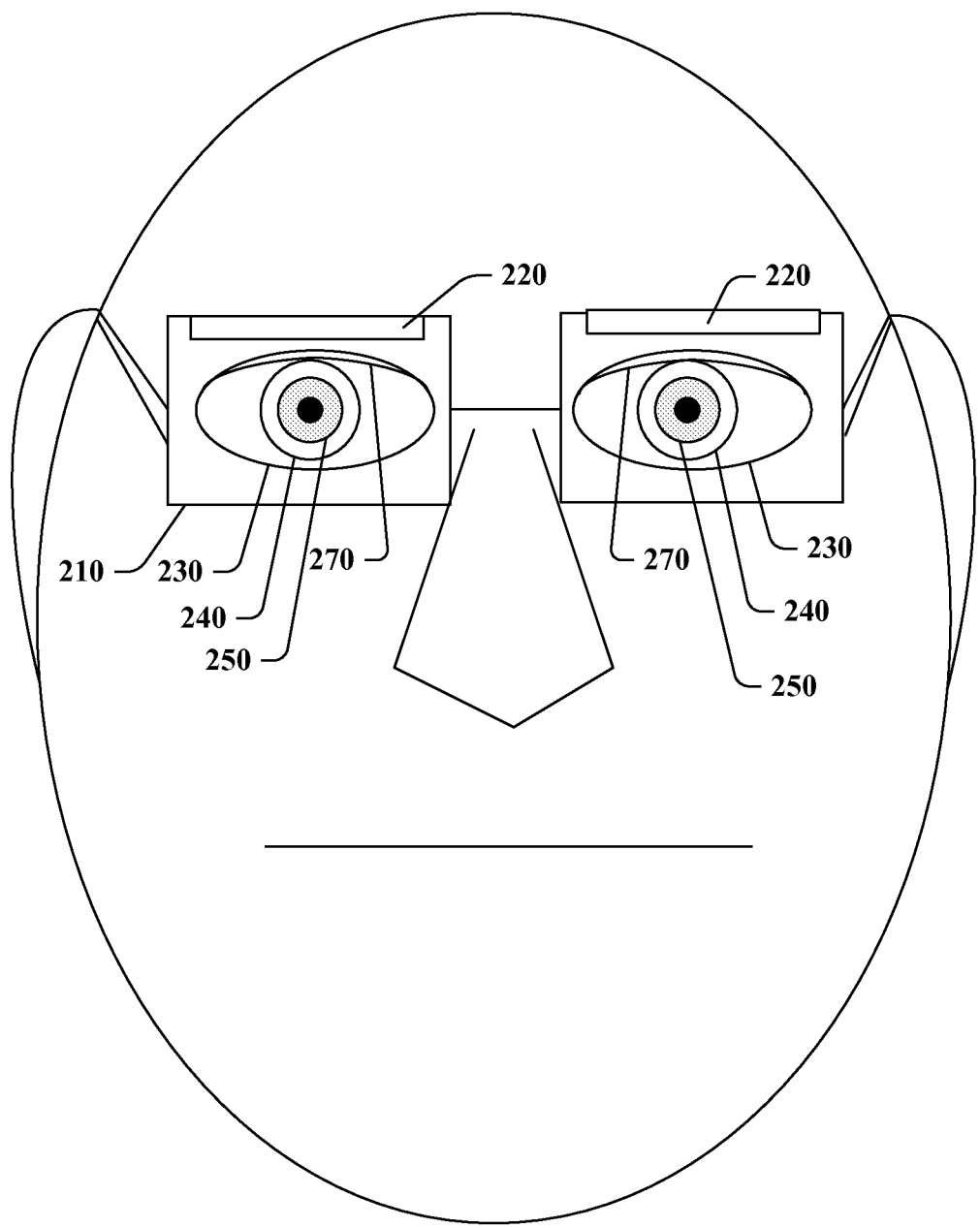
FIG. 2J illustrates a diagram of an exemplary non-limiting system of FIG. 2A being worn by a human user with eyelids open in accordance with an implementation of this disclosure.

Referring to FIG. 2J, is depicted system 200A on a human user. SAW contact lenses 240 are shown worn on both eyes 230, covering iris 250 while eyelid 270 is open. It is to be appreciated that SAW contact lenses 240 can be of any suitable shape or size and be worn on any portion of the eye 230. Wearable device 210 is depicted worn over the eyes 230. Interrogation component 120 instructs interrogation signal transceivers 220 to periodically transmit interrogation signals and receives reflected interrogation signal information corresponding to one or more SAW sensing components 260 from interrogation signal transceivers 220.

Figure 2K:
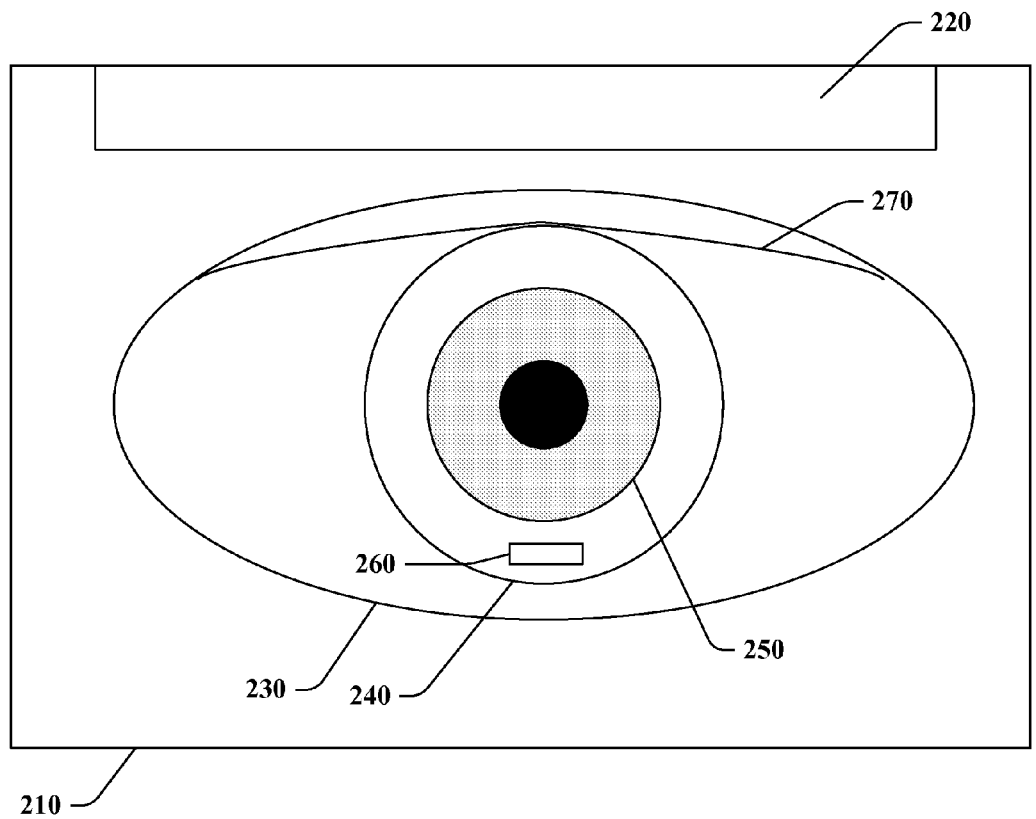
FIG. 2K illustrates a diagram of a close-up view of a portion of the exemplary non-limiting system of FIG. 2J being worn by a human user with eyelid open using a single surface wave acoustic based sensor in accordance with an implementation of this disclosure.

In an embodiment, FIG. 2K depicts a close-up of a portion of wearable device 210 covering eye 230 wearing a SAW contact lens 240 with a single SAW sensing component 260 in a configuration as depicted in FIG. 2D at a bottom of the lens when worn. In this example, eyelid 270 is open. As such, interrogation component 120 receives reflected interrogation signal information corresponding to SAW sensing component 260 not being covered by eyelid 270.

Figure 2L:
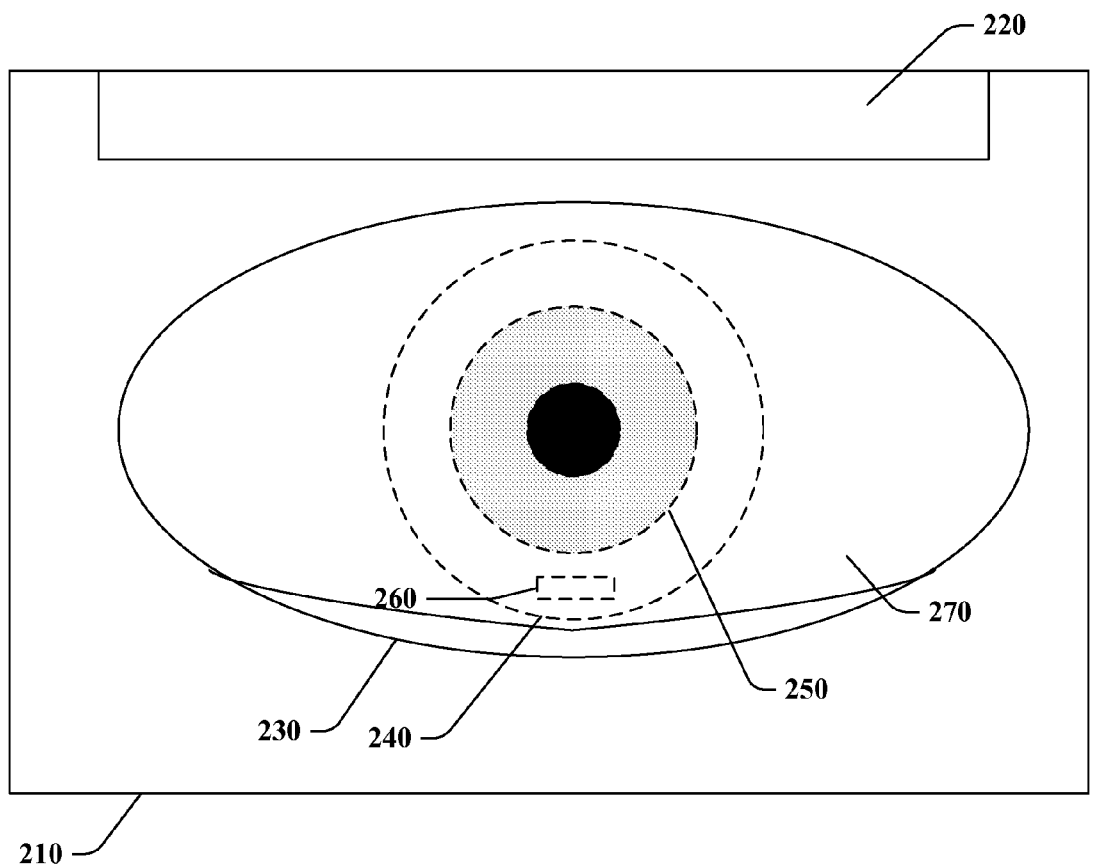
FIG. 2L illustrates a diagram of the close-up view of the portion of the exemplary non-limiting system of FIG. 2K with the eyelid closed in accordance with an implementation of this disclosure.

FIG. 2L corresponds to FIG. 2K with eyelid 270 closed. As such, interrogation component 120 receives reflected interrogation signal information corresponding to SAW sensing component 260 being covered by eyelid 270.

Figure 3A:
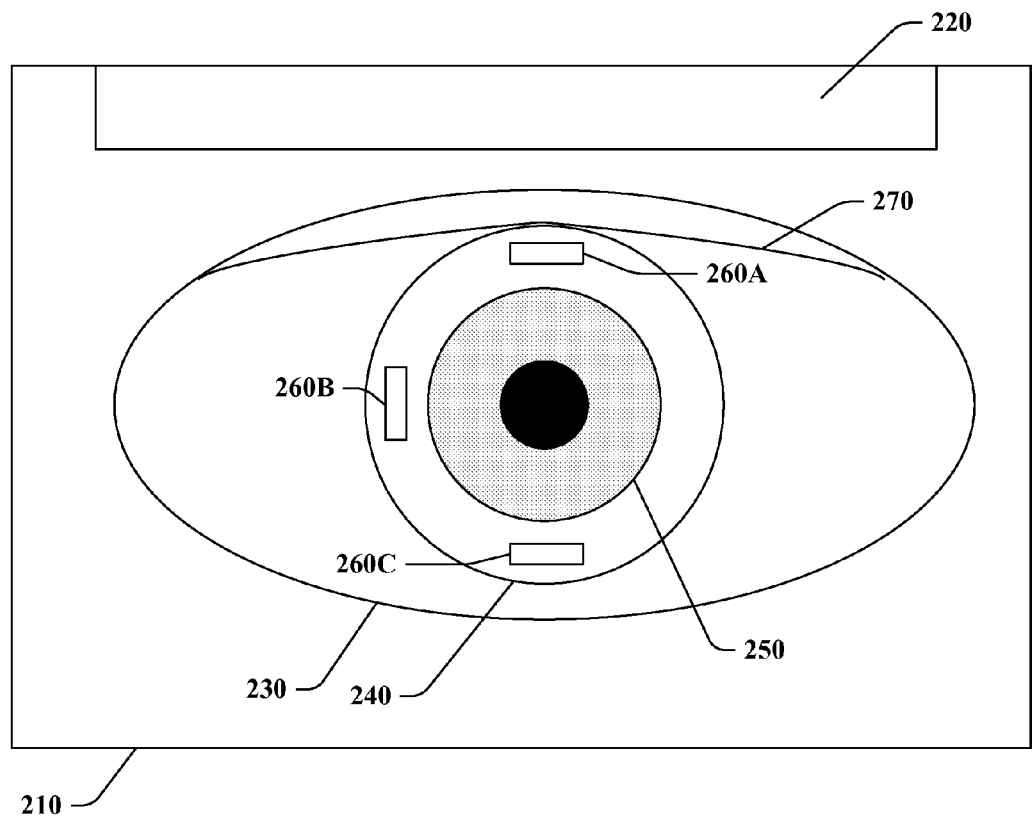
FIG. 3A illustrates a diagram of a close-up view of a portion of the exemplary non-limiting system of FIG. 2J being worn by a human user with eyelid open using three single surface wave acoustic based sensors in accordance with an implementation of this disclosure.

In another embodiment, FIG. 3A depicts a close-up of a portion of wearable device 210 covering eye 230 wearing a SAW contact lens 240 with three SAW sensing components 260A-C in a configuration as depicted in FIG. 2H at top 260A, bottom 260C, and one side 260B of the lens when worn. It is to be appreciated that respective SAW sensing components 260A-C can respectively have unique operating frequencies such that respective reflected interrogation signal information can be provided unique to each respective SAW sensing component 260A-C. In this example, eyelid 270 is open. As such, interrogation component 120 receives reflected interrogation signal information corresponding to SAW sensing components 260A-C not being covered by eyelid 270.

Figure 3B:
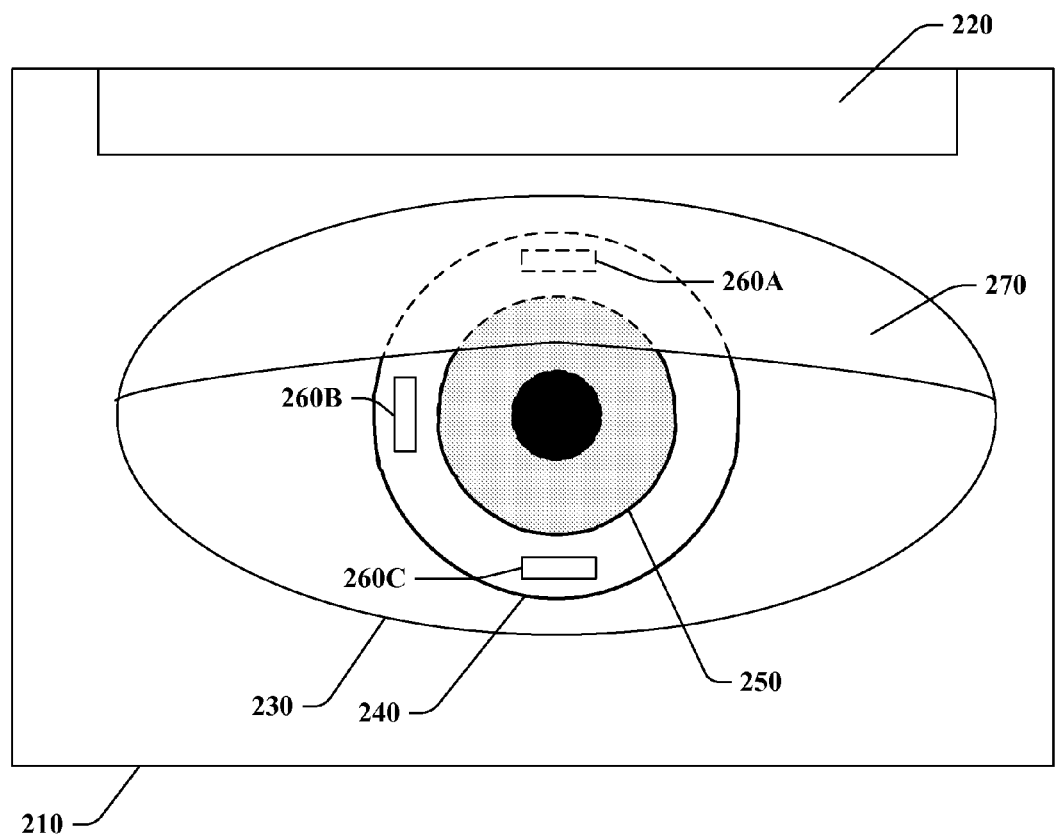
FIG. 3B illustrates a diagram of the close-up view of the portion of the exemplary non-limiting system of FIG. 3A with the eyelid partially closed in accordance with an implementation of this disclosure.

FIG. 3B corresponds to FIG. 3A with eyelid 270 partially closed. As such, interrogation component 120 receives reflected interrogation signal information corresponding to SAW sensing component 260A covered by eyelid 270 and SAW sensing components 260B-C not covered by eyelid 270.

Figure 3C:
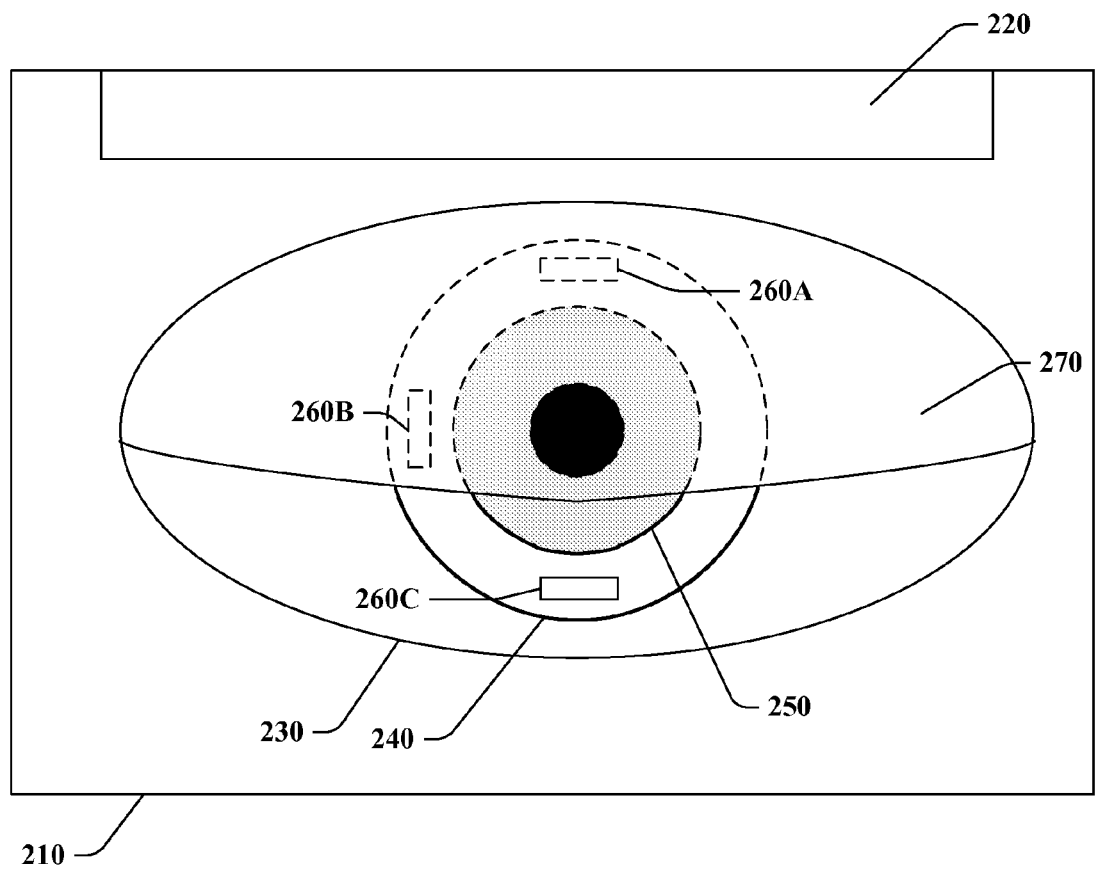
FIG. 3C illustrates a diagram of the close-up view of the portion of the exemplary non-limiting system of FIG. 3B with the eyelid partially closed an amount more than depicted in FIG. 3B in accordance with an implementation of this disclosure.
Figure 3D:
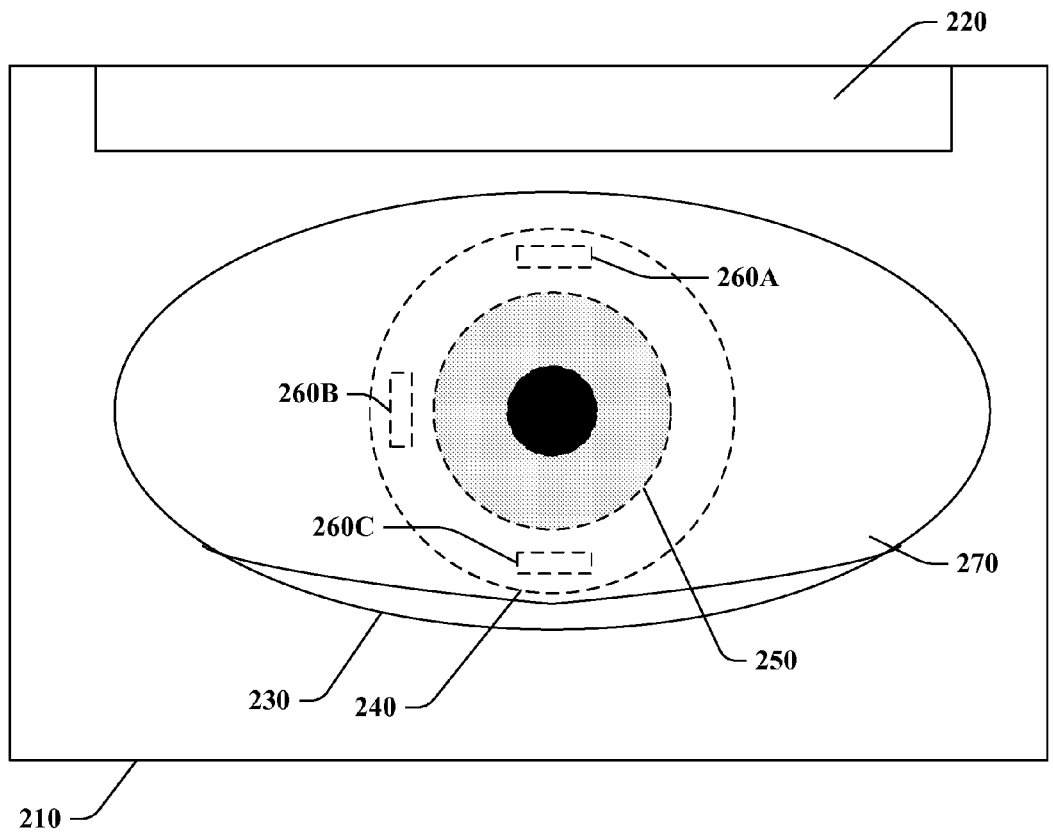
FIG. 3D illustrates a diagram of the close-up view of the portion of the exemplary non-limiting system of FIG. 3C with the eyelid closed in accordance with an implementation of this disclosure.

FIG. 3C corresponds to FIGS. 3A-B with eyelid 270 partially closed an amount more than depicted in FIG. 3B. As such, interrogation component 120 receives reflected interrogation signal information corresponding to SAW sensing components 260A-B being covered by eyelid 270 and SAW sensing component 260C not being covered by eyelid 270. As depicted in FIGS. 3B-3C, reflected interrogation signal information can allow for determination (or inference) of amount of partial blink that has occurred based on known or inferred positioning of SAW sensing components 260A-C.

FIG. 3C corresponds to FIGS. 3A-C with eyelid 270 closed. As such, interrogation component 120 receives reflected interrogation signal information corresponding to SAW sensing components 260A-C being covered by eyelid 270.

FIGS. 2K-L and 3A-D are non-limiting examples of configurations for SAW sensing components 260 on SAW contact lens 240. It is to be appreciated that any suitable number of SAW sensing components 260 can be placed in any suitable location(s) of SAW contact lens 240. It is to be further appreciated that, respective SAW contact lenses 240 in two eyes can have differing configurations of SAW sensing components 260.

With reference to FIG. 1, blink detection component 130 employs the reflected interrogation signal information from interrogation component 120 to determine (or infer) a blink of eye 230. In an embodiment, blink detection component 130 can employ strength of received reflected interrogation signal included in the reflected interrogation signal information to determine (or infer) whether SAW sensing component 260 is covered by eyelid 270. For example, a received reflected interrogation signal strength threshold can be employed to determine if SAW sensing component 260 is covered by eyelid 270. It is to be appreciated that a threshold can be any condition, for example, a greater than condition, less than condition, equal to condition, one or more ranges, or function. If strength of the received reflected interrogation signal is above a received reflected interrogation signal strength threshold, it can be determined (or inferred) that eyelid 270 is not covering SAW sensing component 260. If strength of the received reflected interrogation signal is below or equal to received reflected interrogation signal strength threshold, it can be determined (or inferred) that eyelid 270 is covering SAW sensing component 260. In another example, if strength of the received reflected interrogation signal is within a range indicated by received reflected interrogation signal strength threshold it can be determined (or inferred) that eyelid 270 is covering SAW sensing component 260. In addition, blink detection component 130 can employ reflected interrogation signal information received at multiple points in time to determine duration of eyelid 270 covering SAW sensing component 260. Blink detection component 130 can employ duration of eyelid closure over a period of time, for example by reflected interrogation signal information at consecutive points in time indicating eyelid closure, to determine whether a blink has occurred or whether the eyelid is closed, for example, during a nap. Blink detection component 130 can employ an eyelid closure duration threshold to indicate whether a blink has occurred. For example, if a period of time of eyelid closure is below an eyelid closure duration threshold, it can be determined (or inferred) that a blink has occurred. In another example, if a period of time of eyelid closure is within a range indicated by eyelid closure duration threshold, it can be determined (or inferred) that a blink has occurred.

Furthermore, blink detection component 130 can track eye blinks over a period of time to identify patterns of eye blinking for one or both eyes. It is to be appreciated that pattern of eye blinking can include number of blinks in one or both eyes, duration of blinks in one or both eyes, pause between blinks in one or both eyes, partial blinks (an amount of partial blink) in one or both eyes, or order of blinks in one or both eyes. In an example, blink detection component 130 can identify a known pattern of blinking for one or both eyes that correlates to an associated command input, from a library of commands, of the wearable device 110 or remote device 160. For example, a library of commands can include one or more commands with a respective pattern of eye blinking that corresponds to a respective command.

Interface component 140 can communicate eye blink information, such as a determined (or inferred) blink of an eye, an identified pattern of eye blinking of the eye, or command input associated with an identified pattern of eye blinking, to remote device 160. Furthermore, interface component 140 can receive data or commands from remote device 160. For example, interface component 140 can receive a request for eye blink information from remote device 160 and respond to the request with eye blink information.

It is to be appreciated that in accordance with one or more implementations described in this disclosure, users can opt-in or opt-out of providing personal information, demographic information, location information, proprietary information, sensitive information, or the like in connection with data gathering aspects. Moreover, one or more implementations described herein can provide for anonymizing collected, received, or transmitted data.

Figure 4:
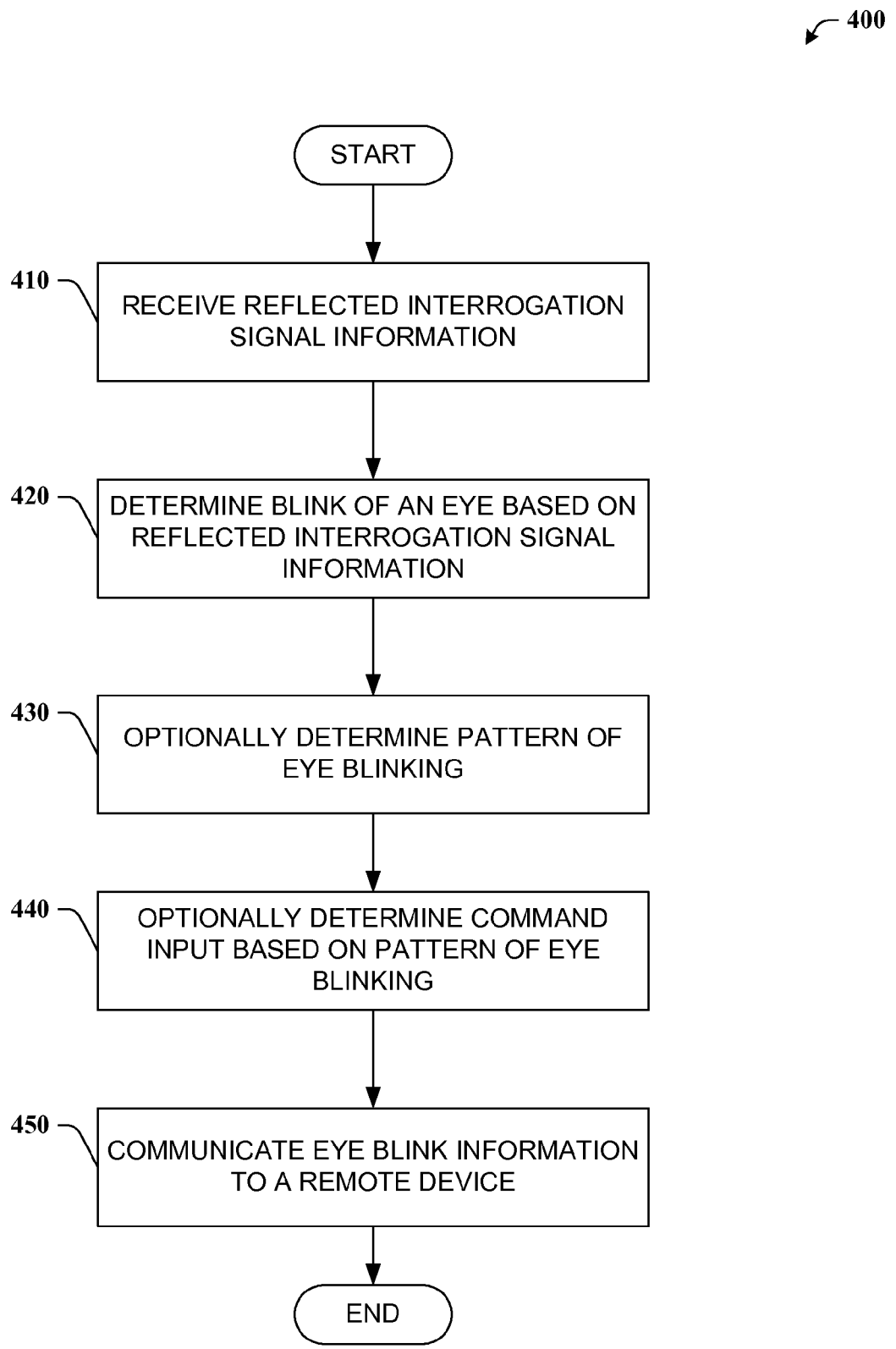
FIG. 4 illustrates an exemplary non-limiting flow diagram for detecting blinking of an eye in accordance with an implementation of this disclosure.
Figure 5:
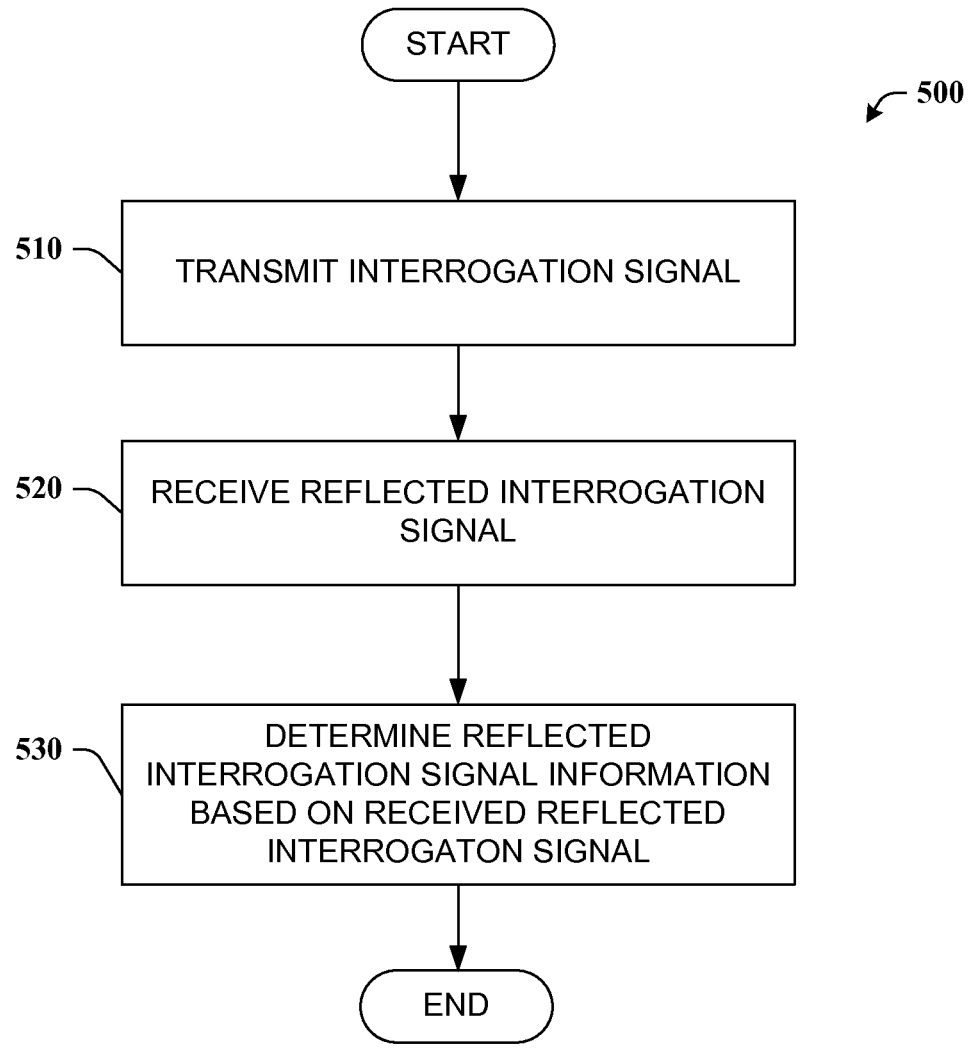
FIG. 5 illustrates an exemplary non-limiting flow diagram for interrogating a surface wave acoustic based contact lens in accordance with an implementation of this disclosure.

FIGS. 4 and 5 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Referring to FIG. 4, an exemplary method 400 for determining blinking of an eye is depicted. At reference numeral 410, reflected interrogation signal information is received (e.g. by an interrogation component 120 or wearable device 110). At reference numeral 420, a blink of the eye is determined (or inferred) based on the reflected interrogation signal information (e.g. by a blink detection component 130 or wearable device 110). At reference numeral 430, an optional act of identifying a pattern of blinking of the eye is performed (e.g. by a blink detection component 130 or wearable device 110). At reference numeral 440, an optional act of determining a command input associated with the identified pattern of eye blinking is performed (e.g. by a blink detection component 130 or wearable device 110). At reference numeral 450, an optional act of communicating eye blink information related to a determined (or inferred) blink of an eye, an identified pattern of eye blinking of the eye, or command input associated with an identified pattern of eye blinking to remote device is performed (e.g. by an interface component 140 or wearable device 110).

Referring to FIG. 5, an exemplary method 500 for interrogating a SAW contact lens is depicted. At reference numeral 510, an interrogation signal is transmitted to one or more SAW contact lenses (e.g. by an interrogation component 120 or interrogation signal transceivers 220). At reference numeral 520, one or more reflected interrogation signals are received from the SAW contact lens (e.g. by the interrogation component 120 or interrogation signal transceivers 220). It is to be appreciated that the received one or more reflected interrogation signals can be on respective unique operating frequencies corresponding to respective SAW sensing components of the one or more SAW contact lenses. At reference numeral 530, respective reflected interrogation signal information is determined for the one or more respective received reflected interrogation signals (e.g. by the interrogation component 120 or interrogation signal transceivers 220).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 6:
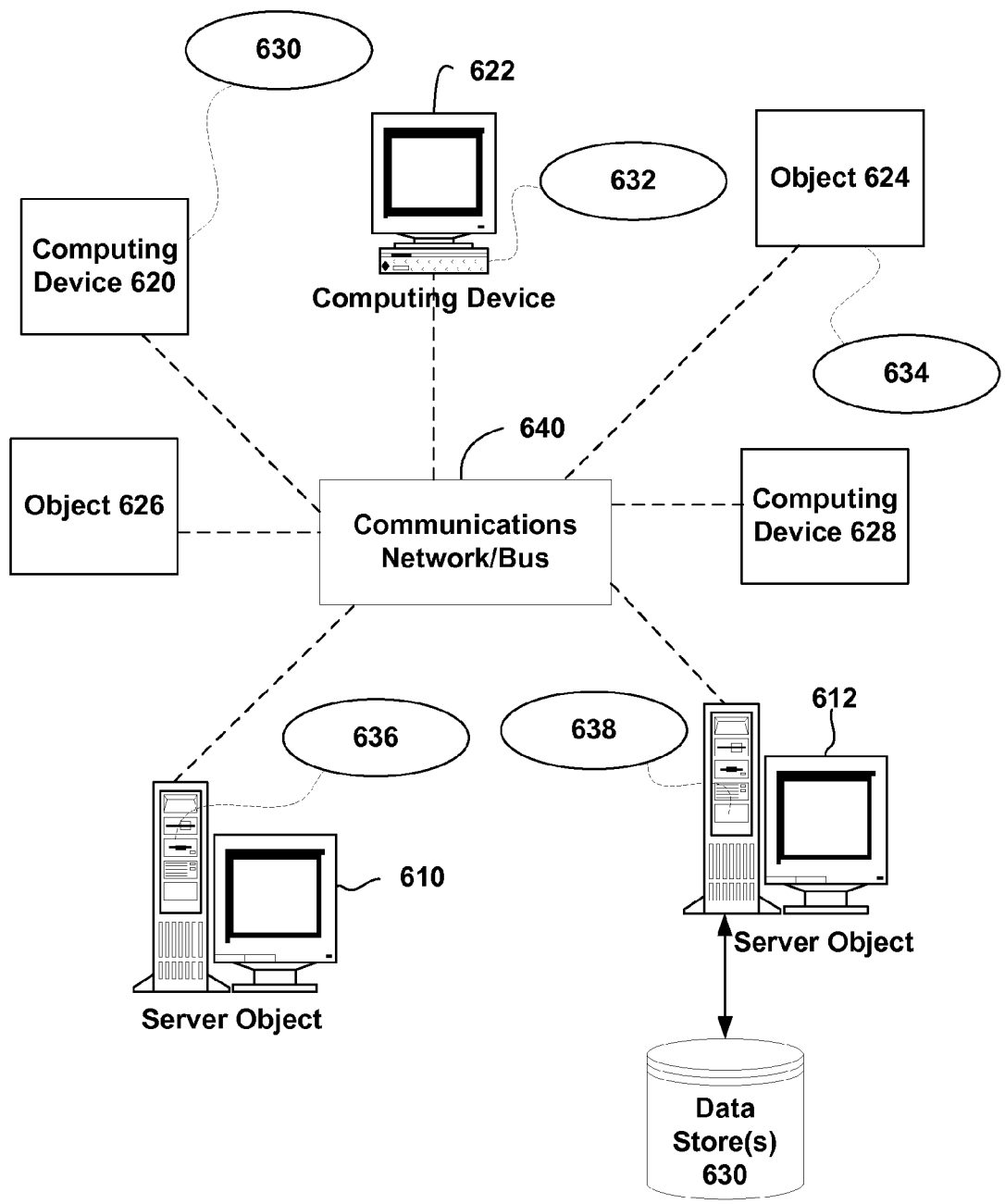
FIG. 6 is a block diagram representing an exemplary non-limiting networked environment in which the various embodiments can be implemented.

FIG. 6 provides a schematic diagram of an exemplary networked or distributed computing environment. The distributed computing environment comprises computing objects 610, 612, etc. and computing objects or devices 620, 622, 624, 626, 628, etc., which may include programs, methods, data stores, programmable logic, etc., as represented by applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, tablets, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, network 640 may comprise other computing objects and computing devices that provide services to the system of FIG. 6, and/or may represent multiple interconnected networks, which are not shown. Each computing object 610, 612, etc. or computing objects or devices 620, 622, 624, 626, 628, etc. can also contain an application, such as applications 630, 632, 634, 636, 638, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc. provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 640 is the Internet, for example, the computing objects 610, 612, etc. can be Web servers, file servers, media servers, etc. with which the client computing objects or devices 620, 622, 624, 626, 628, etc. communicate via any of a number of known protocols, such as the hypertext transfer protocol (HTTP). Objects 610, 612, etc. may also serve as client computing objects or devices 620, 622, 624, 626, 628, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 7 is but one example of a computing device that can be employed with implementing one or more of the systems or methods shown and described in connection with FIGS. 1-7 Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. Neither is the computing environment 700 be interpreted as having any dependency or requirement relating to any one or combination of components illustrated in the exemplary operating environment 700.

With reference to FIG. 7, an exemplary computing device for implementing one or more embodiments in the form of a computer 710 is depicted. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 710. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 760. The remote computer 760 may be a personal computer, a server, a router, a network PC, a peer device or other common network node, or any other remote media consumption or transmission device, and may include any or all of the elements described above relative to the computer 710. The logical connections depicted in FIG. 7 include a network 762, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
    an interrogation component that is configured to:
        transmit an interrogation signal to a contact lens, wherein at least one surface wave acoustic based sensing component is disposed on or within the contact lens; and receive a reflected portion of the interrogation signal from the contact lens, wherein the reflected portion of the interrogation signal is indicative of eyelid location relative to the at least one surface wave acoustic based sensing component; and a detection component configured to determine or infer a location of an eyelid relative to the at least one surface wave acoustic based sensing component based upon at least a signal strength of the reflected portion of the interrogation signal.

2. The system of claim 1, wherein the interrogation component is configured to transmit the interrogation signal at intervals less than a predetermined maximum interval.

3. The system of claim 2, wherein the predetermined maximum interval is based upon an average or shortest length of time of an eye blink.

4. The system of claim 2, wherein the detection component is configured to determine or infer a pattern of eyelid locations over a period of time based on a plurality of reflected portions of the interrogation signal.

5. The system of claim 4, wherein the detection component is configured to match the pattern of eyelid locations to an associated command of a list of commands, wherein respective commands in the list of commands are associated with respective patterns of eyelid locations.

6. The system of claim 1, wherein the system comprises at least one of a head mounted device, heads-up display glasses, a monocle, eyeglasses, sunglasses, a headset, a visor, a cap, a helmet, a mask, a headband, clothing, a mobile phone, a remote device, a wearable device, or a non-wearable device.

7. The system of claim 1, wherein the reflected portion of the interrogation signal has a distinct frequency corresponding to an operating frequency of an associated surface wave acoustic based sensing component of the contact lens.

8. The system of claim 1, wherein the detection component is configured to determine or infer whether the eyelid is covering the at least one surface wave acoustic based sensing component based on the signal strength of the reflected portion of the interrogation signal in comparison to a threshold.

9. A method, comprising:
employing at least one processor executing computer executable instructions embodied on at least one non-transitory computer readable medium to perform operations comprising:
transmitting an interrogation signal to a contact lens, wherein at least one surface wave acoustic based sensing component is disposed on or within the contact lens;
receiving a reflected portion of the interrogation signal from the contact lens, wherein the reflected portion of the interrogation signal is indicative of eyelid location relative to the at least one surface wave acoustic based sensing component; and
inferring a location of an eyelid relative to the at least one surface wave acoustic based sensing component based upon at least a signal strength of the reflected portion of the interrogation signal.

10. The method of claim 9, wherein the transmitting occurs a plurality of times at a predetermined interval.

11. The method of claim 10, further comprising inferring a pattern of eyelid locations over a period of time based on a plurality of reflected portions of the interrogation signal.

12. The method of claim 11, further comprising matching the pattern of eyelid locations to an associated command in a list of commands, wherein respective commands in the list of commands are associated with respective patterns of eyelid locations.

13. The method of claim 9, wherein the reflected portion of the interrogation signal has a distinct frequency corresponding to an operating frequency of an associated surface wave acoustic based sensing component of the contact lens.

14. The method of claim 9, wherein inferring a location of an eyelid relative to the at least one surface wave acoustic based sensing component based upon at least a signal strength of the reflected portion of the interrogation signal comprises:
inferring whether the eyelid is covering the at least one surface wave acoustic based sensing component based on the signal strength of the reflected portion of the interrogation signal in comparison to a threshold.

15. A non-transitory computer-readable medium having instructions stored thereon that, in response to execution, cause at least one device including a processor to perform operations comprising:
transmitting an interrogation signal to a contact lens, wherein at least one surface wave acoustic based sensing component is disposed on or within the contact lens;
receiving a reflected portion of the interrogation signal from the contact lens, wherein the reflected portion of the interrogation signal is indicative of eyelid location relative to the at least one surface wave acoustic based sensing component; and
inferring a location of an eyelid relative to the at least one surface wave acoustic based sensing component based upon at least a signal strength of the reflected portion of the interrogation signal.

16. The non-transitory computer-readable medium of claim 15, wherein the transmitting occurs a plurality of times at a predetermined interval.

17. The non-transitory computer-readable medium of claim 16, wherein the predetermined interval is less than an average or shortest length of time of an eye blink.

18. A contact lens, comprising:
a substrate; and
at least one surface wave acoustic based sensing component disposed on or within the substrate that is configured to reflect a portion of a received interrogation signal, such that a signal strength of the reflected portion of the received interrogation signal is indicative of eyelid location relative to the at least one surface wave acoustic based sensing component.

19. The contact lens of claim 18, wherein the surface wave acoustic based sensing component comprises:
an antenna that is configured to receive the interrogation signal and propagate a first electrical energy from the interrogation signal to a surface acoustic wave filter, wherein the surface acoustic wave filter is configured to:
convert the first electrical energy propagated from the antenna to a first mechanical energy;
convert the first mechanical energy to a second electrical energy and propagate the second electrical energy to a sensor, wherein the sensor is configured to reflect an amount of the second electrical energy back to the surface acoustic wave filter for conversion into a second mechanical energy, wherein the amount is related to the impedance of the sensor, and wherein the impedance of the sensor is related to eyelid location; and
convert the second mechanical energy to a third electrical energy, wherein the third electrical energy is propagated to the antenna.

20. The contact lens of claim 19, further comprising multiple surface acoustic wave filters disposed on or within the substrate, each operating at a different respective frequency.

21. The contact lens of claim 19, wherein the sensor comprises at least one of a light sensor, a conductance sensor, a pressure sensor, or a temperature sensor.

\* \* \* \* \*